US007409274B2

(12) United States Patent
Grana et al.

(10) Patent No.: US 7,409,274 B2
(45) Date of Patent: Aug. 5, 2008

(54) APPARATUS, SYSTEM, AND METHOD FOR IMPROVING ENGINE DEVELOPMENT

(75) Inventors: Thomas A. Grana, Columbus, IN (US); Barty L. Moffett, Seymour, IN (US); Jason H. Stallard, Hayden, IN (US)

(73) Assignee: Cummins, Inc, Columbus, IN (US)

( * ) Notice: Subject to any disclaimer, the term of this patent is extended or adjusted under 35 U.S.C. 154(b) by 381 days.

(21) Appl. No.: 11/204,076

(22) Filed: Aug. 15, 2005

(65) Prior Publication Data

US 2007/0038342 A1 Feb. 15, 2007

(51) Int. Cl.
*G06F 19/00* (2006.01)

(52) U.S. Cl. ......................................... 701/29; 340/901

(58) Field of Classification Search ................... 701/25, 701/29–33, 34–36; 340/901–902, 425.5, 340/438, 439, 459
See application file for complete search history.

(56) References Cited

U.S. PATENT DOCUMENTS 6,141,610 A * 10/2000 Rothert et al. ................ 701/35
6,487,717 B1 * 11/2002 Brunemann et al. ......... 717/173
6,665,606 B2 * 12/2003 Mathew et al. .............. 701/114
6,836,710 B2 * 12/2004 Yamaki ........................ 701/33
2002/0133273 A1 * 9/2002 Lowrey et al. ................ 701/29
2005/0216151 A1 * 9/2005 Gawlik et al. ................. 701/33
2006/0041337 A1 * 2/2006 Augsburger et al. ........... 701/1
2006/0184295 A1 * 8/2006 Hawkins et al. ............... 701/33

* cited by examiner

*Primary Examiner*—Dalena Tran
(74) *Attorney, Agent, or Firm*—Kunzler & McKenzie

(57) ABSTRACT

An apparatus, system, and method are disclosed for improving engine development. Engine development is improved by equipping a vehicle with a data logger to collect engine performance data, automatically retrieving the data via a secure local wireless network, uploading the data to an enterprise communication server via a secure wide area network, and analyzing the data. The vehicles and vehicle depot may be equipped with WAPs. The wide area network may comprise a VPN over the internet. In certain embodiments, the secure local wireless network is only accessible to wireless devices with registered MAC addresses.

25 Claims, 4 Drawing Sheets

APPARATUS, SYSTEM, AND METHOD FOR IMPROVING ENGINE DEVELOPMENT

BACKGROUND OF THE INVENTION

1. Field of the Invention

This invention relates generally to engine development and more particularly relates to the long-distance, automated, and secure development of engines.

2. Description of the Related Art

Effective engine development strategies are becoming increasingly important, under a growing demand for safe, reliable, and environmentally friendly transportation. Generally, engine development includes modeling a proposed design, building an engine according to the design, running the engine to collect engine performance data, and analyzing the data to remedy existing flaws and produce superior engine designs. Though the general concept of gathering and analyzing engine performance data is pervasive in engine development strategies, it is becoming more and more apparent that the current strategies are inadequate.

One engine development strategy involves equipping an engine with a data logger to record engine performance data, manually connecting a computer (or other recording device) to the data logger to download the engine data, manually transporting and connecting the computer to a primary network, and uploading the data to the network for analysis. Having to manually connect and transport a costly device such as a computer, involves time, training, and labor, in addition to risking human errors and accidents.

Another engine development strategy enables real-time data analysis, but includes similar flaws as the previous strategy. The strategy involves running an engine equipped with a standard data logger and manually connecting a computer to display the engine data as it becomes available to the data logger. With such a configuration, both the computer and engine developer must be physically present to analyze the real-time data. If the data is later to be entered into a principle network for further analysis or record keeping purposes, it must undergo similar manual transportation and connection difficulties as the previous strategy.

Additionally, current engine development strategies often fail to provide adequate security. For example, some strategies fail to encrypt engine performance data, provide firewalls, require passwords, or implement other networking protocols designed to ensure secure data transfer. Such strategies expose engine developers to data theft or misappropriation that could result in significant detriment to the engine developer, especially in scenarios involving competing engine developers or unscrupulous investors.

From the foregoing discussion, it should be apparent that a need exists for an apparatus, system, and method that improve engine development. Beneficially, such an apparatus, system, and method would eliminate the risks and costs associated with more manual engine development strategies by simultaneously providing a potentially long-distance, completely automated, and secure system for improving engine development.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for improving engine development that overcome many or all of the above-discussed shortcomings in the art.

In one embodiment, the invention provides a vehicle associated with a vehicle depot and equipped with a data logger that collects data from at least one sensor related to engine performance, a vehicle server proximate the vehicle depot that automatically retrieves engine performance data from the vehicle via a secure local wireless network, and a vehicle server that uploads the engine performance data to an enterprise communication server for analysis via a secure wide area network. In certain embodiments, the invention may also include WAPs on the vehicle and vehicle depot. The present invention enables a long-distance, entirely automated, and secure means for developing and improving engines.

The data logger may collect any variety of engine performance data including information from the engine computer, information from an after-treatment control system, road grade data derived from a global positioning system (GPS), and data from other physical sensors such as heat, pressure, and vibration sensors. The data logger may further operate as a file transfer protocol (FTP) server, provide real-time engine performance data, and receive updates via the secure local wireless network. The data logger may implement security protocols such as encryption, and requiring passwords or registered media access control (MAC) addresses.

In addition to automatically retrieving and uploading engine performance data, the vehicle server may receive updates via the secure wide area network. In certain embodiments, the various functions of the vehicle server are facilitated by the vehicle server operating as a FTP server. The secure wide area network may be a VPN over the internet, thereby enabling secure, long-distance data transfers. The enterprise communication server may format engine performance data into a variety of reports convenient for data analysis and engine development.

The apparatus to improve engine development is provided with a logic unit containing a plurality of modules to functionally execute the necessary steps of improving engine development. In one embodiment, the apparatus includes a local wireless network for communicating with wireless communication devices proximate to a vehicle depot, a security module to authenticate a wireless equipped vehicle, an automatic retrieval module to automatically retrieve engine performance data from the vehicle, and an upload module to upload the engine performance data to an enterprise communication server via a secure wide area network. In one embodiment, the secure wide area network is a VPN operating on the internet.

The update module may update the data logger via the secure local wireless network or apply updates received via the wide area network. The updates for both the data logger and vehicle server may originate from the enterprise communication server, thereby providing a centralized update source. The security module may encrypt or decrypt a data stream, require or supply a registered MAC address, or bypass the enterprise communication server firewall.

A method of the present invention is also presented for improving engine development. The method in the disclosed embodiments substantially includes the steps necessary to carry out the functions presented above with respect to the operation of the described system and apparatus. In one embodiment, the method includes equipping a vehicle associated with a vehicle depot with a data logger that collects data from at least one sensor related to engine performance, driving the vehicle to collect engine performance data, automatically retrieving the engine performance data from the vehicle through a secure local wireless network proximate to the vehicle depot, uploading the engine performance data to an enterprise communication server via a secure wide area network, and analyzing the engine performance data to improve engine development. Accordingly, the present invention provides a potentially long-distance, completely automated, and secure means for improving engine development.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
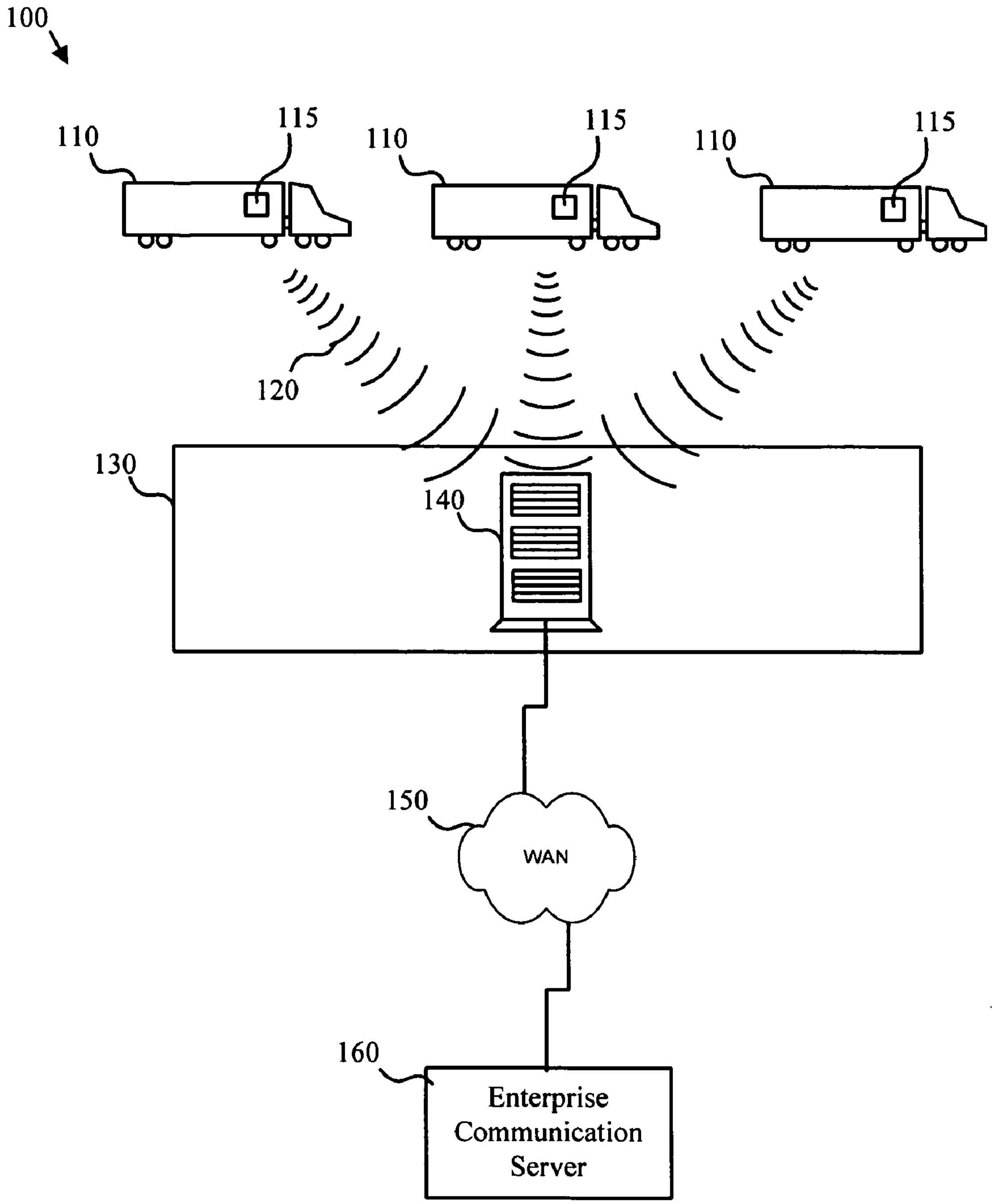
FIG. 1 is block diagram of one embodiment of an improved engine development system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the order in which a particular operation occurs may or may not strictly adhere to the order of the corresponding steps shown.

FIG. 1 is a block diagram of one embodiment of an engine development system 100. The depicted system 100 includes vehicles 110 equipped with a data logger 115, a secure wireless network 120, a vehicle depot 130, a vehicle server 140, a secure wide area network 150, and an enterprise communication server 160. In certain embodiments, the vehicle 110 and vehicle depot may be quipped with WAPs for vehicle to vehicle communication. The various components of the system 100 function cooperatively to facilitate the long-distance, completely automatic, and secure transfer of engine performance data to engine developers for analysis and engine development.

The depicted data logger 115 collects data from at least one sensor related to engine performance. The data logger 115 may record any variety of information related to vehicle engine performance including information from the engine computer, information from an after-treatment control system, road grade data derived from a global positioning system (GPS), and information from other physical sensors including heat, pressure, and vibration sensors. Accordingly, the system 100 enables engine performance data to be collected with precision and specificity.

The depicted secure local wireless network enables communication between the vehicle 110 and the vehicle server 140, eliminating the need for cumbersome networking cords, outlets, and equipment. The network 120 may be secured by various means including configuring the data logger 110 or vehicle server 140 to require passwords, encrypt the engine performance data, or only provide access to wireless devices with registered MAC addresses. Accordingly, the system 100 ensures that valuable engine performance data cannot be easily stolen, corrupted, or otherwise misappropriated by those that could do harm to the developer.

The depicted vehicle server 140 automatically retrieves engine performance data from the vehicle 110 via the secure local wireless network 120. In certain embodiments, the vehicle server 140 operates as a FTP server. The vehicle server 140 may immediately retrieve data or wait for a scheduled retrieval time or retrieval command. Automatically retrieving information expedites the data retrieval process and greatly reduces or eliminates, training and labor costs, accidents, data misappropriation, and so on.

The vehicle server 140 also uploads engine performance data to an enterprise communication server 160 for analysis via a secure wide area network 150. In certain embodiments, the secure wide area network 150 comprises a virtual private network (VPN) operating over the internet. The VPN may also implement security protocols, such as passwords and firewalls, to ward against data misappropriation. Connecting the vehicle server 140 to the enterprise communication server 160 via a secure VPN over the internet, enables the system 100 to perform secure, long-distance data transfers.

The enterprise communication server 160 may format engine performance data into reports to facilitate analysis. In certain embodiments, the reports may be standardized or customized, depending upon the needs of the engine developer. Also, the reports may be generated immediately upon data reception, according to a schedule, or in response to a report command. Accordingly, the system 100 provides a long distance, entirely automated, secure, and adaptable means for changing raw engine performance data into reports for engine development and design.

In certain embodiments, the data logger 115 and vehicle server 140 receive periodic updates. The data logger 110 may receive updates via the secure local wireless network 120 and the vehicle server 140 receives updates via the secure wide area network 160. Data logger updates may originate from other vehicles 110, the vehicle server 140, or the enterprise communications sever 160. Vehicle server updates may originate from the enterprise communication server 160. Providing updates may be facilitated by the data logger 115 and vehicle server 140 operating as FTP servers. Accordingly, the system 100 enables the expeditious implementation of updates, including new performance measurements and the resolution of software or certain networking difficulties.

Additionally, the system 100 may enable a developer to view the vehicle performance data in real-time. In embodiments wherein real-time performance data is viewed from the enterprise communication server 160, the vehicle server 140 may function as a data viewer for the enterprise communication server 160, thereby expediting the system's data flow. Real-time communication in this manner enables engine developers to analyze engine performance data as it is produced, without having to be proximate the vehicle 110, vehicle server 140, or even the vehicle depot 130.

In certain embodiments, the enterprise communication server 160 controls the vehicle server's automatic retrieval, uploading, updating, and security functions, which in turn enables the enterprise server 160 to update and configure the data logger 115. Accordingly, not only does the present invention enable the long-distance, automatic, and secure collection and analysis of engine performance data, but the invention also provides a means for formatting performance data, viewing data in real-time, and managing the entire system 100 from a single location.

Figure 2:
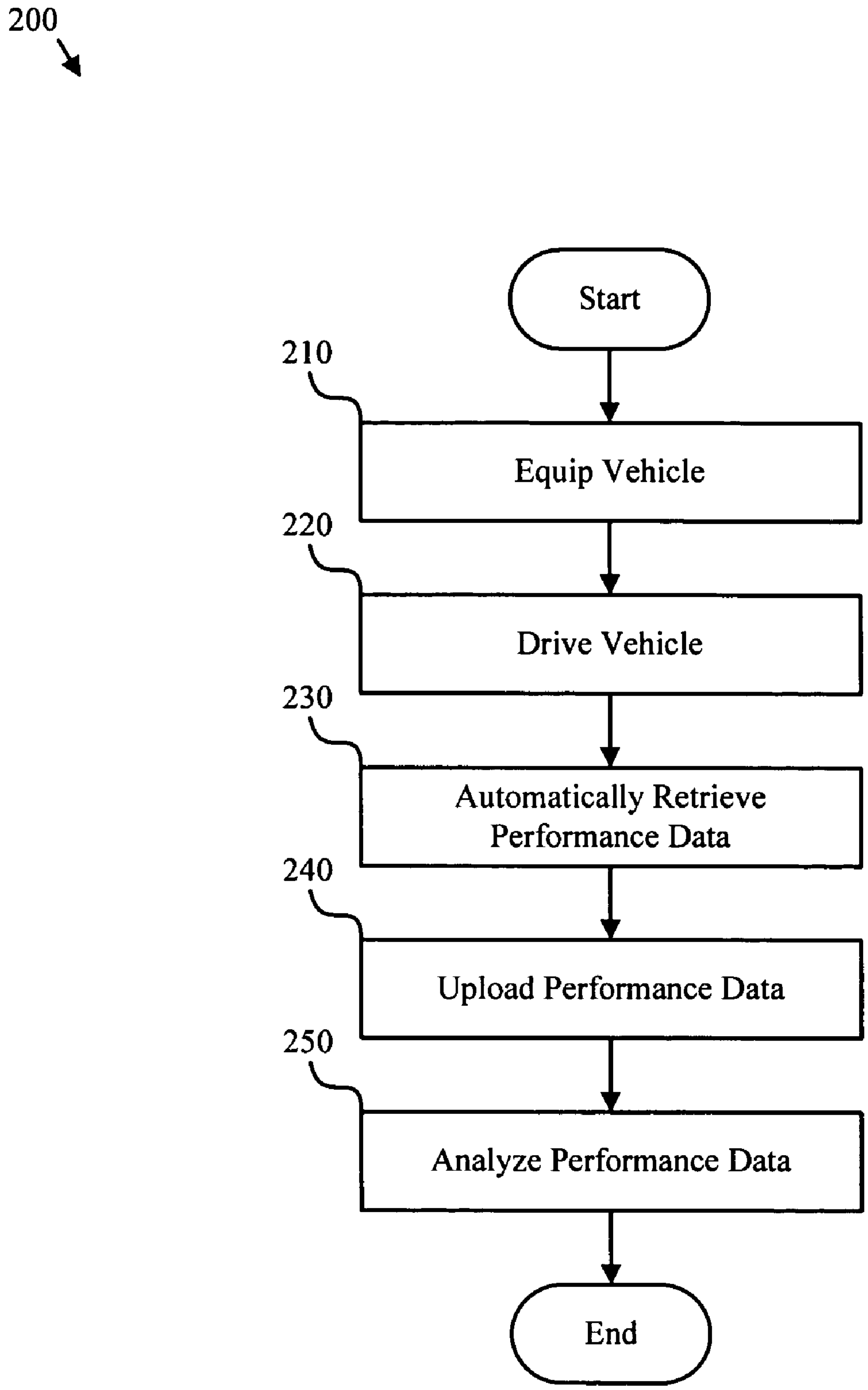
FIG. 2 is a flow chart diagram of one embodiment of a method for improving engine development.

FIG. 2 is a flow chart diagram depicting one embodiment of a method 200 for improving engine development. The depicted method 200 includes equipping 210 a vehicle associated with a vehicle depot with a data logger that collects data from at least one sensor related to engine performance, driving 220 the vehicle to collect engine performance data, automatically retrieving 230 the engine performance data from the vehicle via a secure local wireless network proximate the vehicle depot, uploading 240 the engine performance data to an enterprise communication server via a secure wide area network, and analyzing 250 the engine performance data to improve engine development. The method 200 may also include equipping the vehicle and vehicle depot with WAPs. The various steps of the method 200 enable an automated, long-distance, and secure method for improving engine development.

Automatically retrieving 230 engine performance data may include detecting a vehicle 110 equipped with a wireless device and providing or requiring a registered MAC address or password therefrom. Automatically retrieving 230 may also include immediately retrieving encrypted engine performance data, or waiting for a scheduled retrieval or retrieval command. In certain embodiments, the retrieval command originates from the enterprise communication server 160.

Once the vehicle server 140 has retrieved the encrypted engine performance data, uploading 240 the engine performance data may include immediately uploading the data, or waiting for a schedule upload or upload command. In certain embodiments, the upload command originates from the enterprise communication network 160. Additionally, uploading 240 the performance data may include a VPN communication over the internet.

Analyzing 250 the engine performance data may include formatting the performance data into a report, after the performance data is received by the enterprise network 160. In selected embodiments, the vehicle server 140 and the enterprise communication server 160 can format the performance data into reports. The reports may be generated immediately after the performance data arrives, according to a report schedule, or in response to a report command. The reports may include any type or style of report congenial to expeditious and effective engine development.

In certain embodiments, the method 200 further comprises updating the data logger 115 or vehicle server 140. Updating the data logger 115 may include the data logger 115 receiving an update via the secure local wireless network. The data logger updates originate from enterprise communication network, the vehicle server, or another vehicle. Updating the vehicle server 140 may include the vehicle server 140 receiving an update via the secure wide area network. In certain embodiments, updating the data logger 115 and vehicle server 140 is facilitated by configuring the data logger 110 and vehicle server 140 to operate as a FTP servers.

Figure 3:
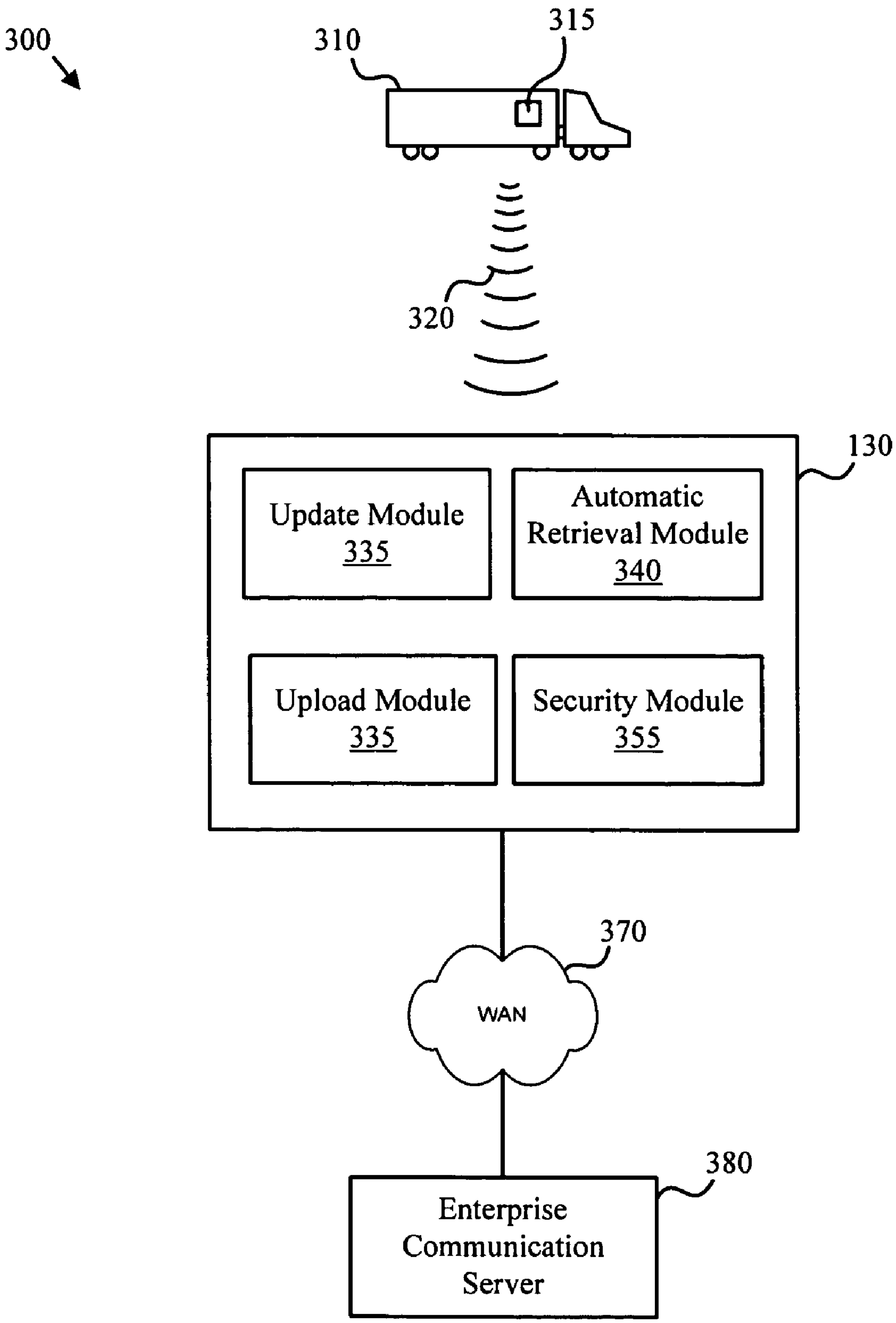
FIG. 3 is a block diagram of one embodiment of an improved engine development apparatus.

FIG. 3 is a block diagram of one embodiment of an improved engine development apparatus 300. The depicted apparatus 300 is one example of the depicted vehicle server 140 seen in FIG. 1. The apparatus 300 includes an update module 335, automatic retrieval module 340, upload module 350, and security module 355. The various modules 335, 340, 350, 355 enable the apparatus 300 to automatically retrieve engine performance data, upload the data to an enterprise communication server 380, and receive and apply updates, in a secure manner.

The depicted automatic retrieval module 340 automatically retrieves engine performance data from the vehicle 310. In certain embodiments, the automatic retrieval module 340 detects a vehicle 310 equipped with a data logger 315 and wireless communication device, establishes a wireless connection therewith, and retrieves engine performance data therefrom. The data retrieved by the automatic retrieval module 340 may include any variety of engine performance data or information regarding the data logger itself 315. Additionally, the automatic retrieval module 240 may retrieve engine performance data in real-time, which may include accessing a data logger GUI.

The depicted upload module 350 uploads the engine performance data to an enterprise communication server 380 via a secure wide area network 370. The upload may be automated, scheduled, or in response to an upload command. In one embodiment, the upload module 350 uploads engine performance data in real-time. As the wide area network 370 may be implemented as a VPN over the internet, the upload module 350 enables the long-distance transfer of engine performance data.

The depicted security module 355 authenticates a vehicle 310 equipped with a wireless communication device such as a WAP. In one embodiment, the security module 355 authenticates the vehicle by verifying the MAC address of the vehicle's wireless communication device. The security module 355 may encrypt or decrypt data as it flows to and from the data logger 315, or to and from the enterprise communication server 380. The module 335 may also bypass or otherwise obtain clearance from an enterprise communication server firewall. The security module 355 may also provide a MAC address to the data logger 315 or associated wireless device to ensure the secure transfer of data.

The depicted update module 335 updates the data logger 315 or applies updates received from the wide area network 370. Providing a means for remotely updating multiple vehicle servers 330 and data loggers 315 from a single enterprise communication server 380 minimizes risks and labor costs associated with manual updating procedures, especially when long distances are involved.

Figure 4:
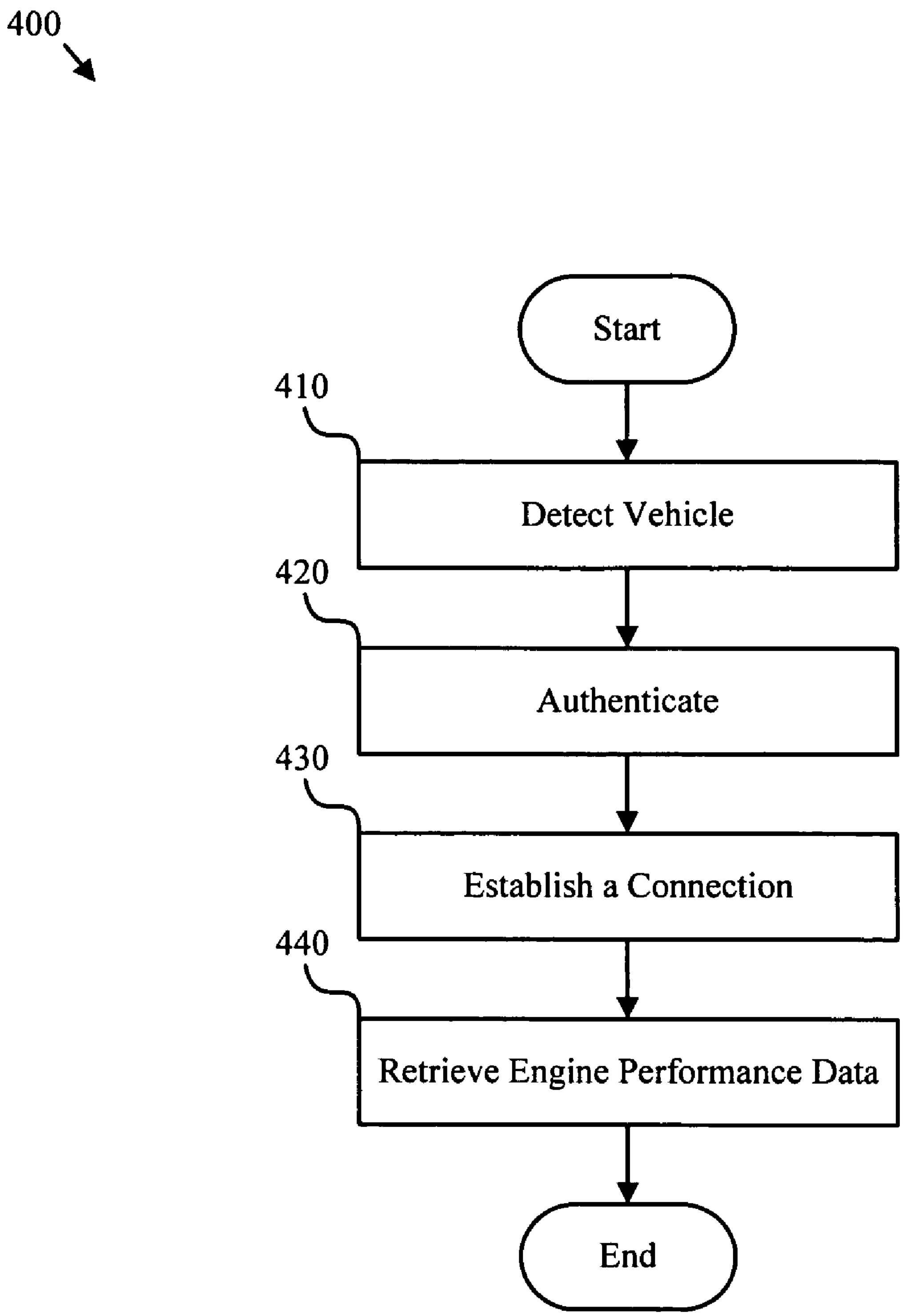
FIG. 4 is a flow chart diagram of one embodiment of a method for automatically retrieving engine performance data.

FIG. 4 is a flow chart diagram of a method 400 for automatically retrieving engine performance data. The method 400 includes detecting 410 a vehicle equipped with a data logger and wireless device, authenticating 420 the vehicle's wireless device, establishing 430 a wireless connection with the vehicle, and retrieving 440 the engine performance data stored on the vehicle's data logger. In certain embodiments, authenticating 420 includes requiring a password or registered MAC address from vehicle's wireless device. The method 400 provides a secure and completely automated process for retrieving data logger information.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

In certain embodiments, the method 400 includes encrypting the communications between the vehicle's wireless device and the vehicle server 140. In certain embodiments, the method 400 also includes automatically uploading the data to an enterprise communication server 180, and storing the data pending a scheduled upload or upload request. Providing a means of securely and automatically retrieving engine performance data from a vehicle data logger 115 eliminates the risks and costs associated with more manual engine development systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving engine development, the method comprising:

equipping a vehicle associated with a vehicle depot with a data logger, the data logger configured to selectively collect data directly from first sensor related to engine performance, the vehicle depot being equipped with a vehicle server;

driving the vehicle to collect engine performance data;

automatically retrieving the engine performance data from the vehicle to the vehicle server via a secure local wireless network proximate to the vehicle depot;

uploading the engine performance data to an enterprise communication server via a secure wide area network;

analyzing the engine performance data to improve engine development; and updating the data logger, wherein updating comprises instructing the data logger to collect new performance data by collecting data directly from a second sensor related to engine performance.

2. The method of claim 1, further comprising equipping the vehicle or vehicle depot with a WAP to extend the coverage of the secure local wireless network.

3. The method of claim 1, wherein the vehicle server and data logger operate as FTP servers.

4. The method of claim 1, wherein the secure wide area network operates as a VPN over the internet.

5. The method of claim 1, further comprising formatting the engine performance data into a report.

6. The method of claim 1, further comprising monitoring engine performance data in real-time.

7. The method of claim 1, wherein the data logger is updated via the secure local wireless network.

8. The method of claim 1, wherein the vehicle server is updated via the secure wide area network.

9. The method of claim 1, further comprising requiring a registered MAC address to access the secure local wireless network.

10. A system for improving engine development, the system comprising:

a plurality of vehicles associated with a vehicle depot, each vehicle being equipped with a data logger, the data logger configured to collect data from at least one sensor related to engine performance;

a vehicle server proximate the vehicle depot, the vehicle server configured to automatically retrieve engine performance data from the vehicles via a secure local wireless network; and the vehicle server further configured to upload the engine performance data to an enterprise communication server for analysis via a secure wide area network;

wherein the data logger of each vehicle is updatable via the vehicle server, enterprise communication server, and another of the plurality of vehicles.

11. The system of claim 10 wherein the vehicle or vehicle depot is equipped with a WAP to extend the coverage of the secure local wireless network.

12. The system of claim 10 wherein the vehicle server and data logger are configured to operate as a FTP servers.

13. The system of claim 10 wherein the secure wide area network operates as a VPN over the internet.

14. The system of claim 10 wherein the performance data is formatted into a report.

15. The system of claim 10 wherein the data logger is further configured to provide real-time engine performance data.

16. The system of claim 10 wherein the data logger is updated via the secure wireless network.

17. The system of claim 10 wherein the vehicle server is updated via the secure wide area network.

18. The system of claim 10 wherein the vehicle communicates directly with another vehicle via the secure local wireless network.

19. The system of claim 10 wherein the data logger or vehicle computer is configured to provide a registered MAC address before accessing the secure local wireless network.

20. An apparatus for improving engine development, the apparatus comprising:

a local wireless network comprising a vehicle server located at a vehicle depot, the vehicle server being configured to wirelessly communicate with wireless communication devices proximate to the vehicle depot;

a security module configured to verify a wireless MAC address of a vehicle equipped with a wireless communication device;

an automatic retrieval module configured to automatically retrieve engine performance data from the vehicle to the vehicle server via the wireless communication device; and an automatic upload module configured to automatically upload the engine performance data from the vehicle server to an enterprise communication server remote from the vehicle depot via a secure wide area network;

wherein a user remote from the vehicle depot can view the performance data retrieved from the vehicle in real time via the enterprise communication server.

21. The apparatus of claim 20 wherein the local wireless network comprises at least one WAP.

22. The apparatus of claim 20 further comprising an update module configure to update the data logger or apply updates from the wide area network.

23. The apparatus of claim 20 wherein the security module is further configured to encrypt or decrypt a data stream.

24. The apparatus of claim 20 wherein the secure wide area network operates as a VPN over the internet.

25. A machine readable medium comprising operations for improving engine development, the operations comprising:

automatically retrieving engine performance data from a vehicle associated with and proximate to a vehicle depot via a secure local wireless network;

automatically uploading the retrieved engine performance data to a vehicle server proximate the vehicle depot;

automatically uploading the engine performance data from the vehicle server to an enterprise communication server remote from the vehicle depot via a secure wide area network; and analyzing the engine performance data in real time via the enterprise communication server to improve engine development.

* * * * *